United States Patent
Puranik et al.

(10) Patent No.: US 9,295,069 B2
(45) Date of Patent: Mar. 22, 2016

(54) RADIO FREQUENCY RADIATION EXPOSURE MITIGATION USING ANTENNA SWITCHING

(71) Applicant: QUALCOMM Incorporated, San Diego, CA (US)

(72) Inventors: Anand Krishna Puranik, Hyderabad (IN); Debesh Kumar Sahu, Hyderabad (IN); Venkata Siva Prasad Rao Gude, San Diego, CA (US); Tushar Gupta, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/296,913

(22) Filed: Jun. 5, 2014

(65) Prior Publication Data

US 2015/0358979 A1    Dec. 10, 2015

(51) Int. Cl.
*H04W 72/08* (2009.01)
(52) U.S. Cl.
CPC ................... *H04W 72/085* (2013.01)
(58) Field of Classification Search
CPC .... H04B 1/3838; H04B 1/3833; H01Q 1/245; H01Q 1/242; H04W 72/085
See application file for complete search history.

(56) References Cited

U.S. PATENT DOCUMENTS

| | | | |
|---|---|---|---|
| 5,541,609 A | 7/1996 | Stutzman et al. | |
| 5,634,204 A * | 5/1997 | Takahashi et al. | 455/134 |
| 6,140,970 A * | 10/2000 | Ylijurva | H01Q 1/243 343/702 |
| 6,285,333 B1 * | 9/2001 | Reed | H01Q 13/103 343/767 |
| 2003/0083058 A1 | 5/2003 | Mayer | |
| 2009/0174611 A1 * | 7/2009 | Schlub et al. | 343/702 |
| 2009/0295648 A1 * | 12/2009 | Dorsey et al. | 343/702 |
| 2011/0080289 A1 * | 4/2011 | Minton | 340/573.1 |
| 2012/0062424 A1 | 3/2012 | Hwang | |
| 2012/0163364 A1 | 6/2012 | Tsai et al. | |
| 2012/0244895 A1 * | 9/2012 | Thomas et al. | 455/500 |
| 2013/0078930 A1 * | 3/2013 | Chen et al. | 455/74 |

(Continued)

FOREIGN PATENT DOCUMENTS

| | | |
|---|---|---|
| JP | 2003283393 A | 10/2003 |
| WO | 9829969 | 7/1998 |

(Continued)

OTHER PUBLICATIONS

International Search Report and Written Opinion—PCT/US2015/029237—ISA/EPO—Jul. 1, 2015.

*Primary Examiner* — Marisol Figueroa
(74) *Attorney, Agent, or Firm* — The Marbury Law Group, PLLC

(57) ABSTRACT

Methods, devices, and systems embodiments enable a multi-antenna mobile device to mitigate radio frequency (RF) radiation exposure to users. A processor may determine a distance between the multi-antenna mobile device and the select portion of the user and switch from using a first antenna that is closer to the select portion of the user to using a second antenna when the multi-antenna mobile device is close to the user. The signal strength of the first antenna may be compared to the signal strength of a second antenna of the multi-antenna mobile device, and the second antenna may be used instead of the first antenna when the signal strength of the first antenna is within a predetermined threshold of the signal strength of the second antenna. If acceptable signal quality is not obtained with the second antenna, the multi-antenna mobile device may switch back to the first antenna.

25 Claims, 6 Drawing Sheets

(56) References Cited

U.S. PATENT DOCUMENTS

2013/0161480 A1* 6/2013 Arena ............................ 248/694
2013/0178174 A1 7/2013 Geris et al.
2014/0080548 A1* 3/2014 Chen et al. ................. 455/569.1

FOREIGN PATENT DOCUMENTS

| WO | 2007023490 A1 | 3/2007 |
| WO | 2008008078 A1 | 1/2008 |
| WO | 2013101106 A1 | 7/2013 |

* cited by examiner

RADIO FREQUENCY RADIATION EXPOSURE MITIGATION USING ANTENNA SWITCHING

BACKGROUND

Mobile communication devices with more than one of the same type of antenna are becoming increasingly popular because of the versatility they provide. Some multi-antenna mobile devices include more than one antenna for redundancy of establishing and/or maintaining wireless communications. Other multi-antenna mobile devices include more than one antenna to accommodate more than one subscriber identification module (SIM), allowing more than one active connection with the wireless networks corresponding to each SIM. Many of these multi-antenna mobile devices are capable of switching between antennas in order to ensure the strongest possible connection for at least one communication session. An onboard processor compares signal strengths among antennas in order to use the stronger signal. In addition, some multi-antenna mobile devices consider power expenditures when selecting an antenna to use for power conservation. However, these solutions do not consider or alter device settings to reduce radio frequency radiation exposure to the user.

SUMMARY

Methods, devices, and systems of various embodiments enable a multi-antenna mobile device having a first antenna and a second antenna to mitigate radio frequency (RF) radiation exposure to a user. In various embodiments, a processor of a multi-antenna mobile device may determine whether the multi-antenna mobile device is at least a predetermined distance from a select portion of the user, and active communications may be switched from using the first antenna to using the second antenna in response to determining that the multi-antenna mobile device is within the predetermined distance from the select portion of the user.

In some embodiments, determining whether the multi-antenna mobile device is within the predetermined distance from the select portion of the user may be based on receiving an indication that at least one of a speaker-mode is on, a headphone jack is plugged-in, and a Bluetooth communication is active. In some embodiments, determining whether the multi-antenna mobile device is within the predetermined distance from the select portion of the user may be based on receiving a sensor input from at least one of a motion sensor, image sensor and pressure sensor. In some embodiments, determining whether the multi-antenna mobile device is within the predetermined distance from the select portion of the user may use a predictive analysis based on at least one of a received indication and a sensor input. The predictive analysis may use an inference engine and the received indication may include input from a headphone jack, a Bluetooth speaker-microphone connection, an active speaker-mode, a motion sensor, an image sensor, and/or a pressure sensor. In this way, a processor may receive a proximity input and determine whether the proximity input corresponds to an indication that the multi-antenna mobile device is within the predetermined distance from the select portion of the user. In addition, the processor may generate a pre-mitigation control output reflecting the determination regarding whether the multi-antenna mobile device is at least the predetermined distance from the select portion of the user.

In some embodiments, methods, devices, and systems may compare a first signal strength of the first antenna to a second signal strength of the second antenna in response to determining that the multi-antenna mobile device is within the predetermined distance from the select portion of the user. Switching active communications from using the first antenna to using the second antenna may also be accomplished in response to the second signal strength equaling or exceeding the first signal strength adjusted by a comparison threshold. The compared first signal strength of the first antenna may include a first transmit signal strength and/or a first receive signal strength. Similarly, the compared second signal strength of the second antenna may include a second transmit signal strength and/or a second receive signal strength. Switching active communications from using the first antenna to using the second antenna may alternatively be accomplished in response to determining that the receive and transmit signal strengths on the second antenna are within a signal strength threshold. The active communications may be switched back to using the first antenna in response to determining that either of the receive and transmit signal strengths on the second antenna are not within the signal strength threshold. In addition, a configuration input may be received for adjusting the signal strength threshold. In this way, the signal strength threshold may be changed in response to receiving the configuration input. In addition, another configuration input may be received for adjusting the comparison threshold. In this way, the comparison threshold may be changed in response to receiving the other configuration input.

In some embodiments, methods, devices, and systems determine whether the first antenna is closer to a select portion of the user than the second antenna. Switching active communications from using the first antenna to using the second antenna may be further in response to determining that the first antenna is closer to the select portion of the user than the second antenna. In addition, a determination may be made as to whether to activate RF radiation mitigation using antenna switching. In this way, determining whether the multi-antenna mobile device is within the predetermined distance from the select portion of the user may be performed in response to determining to activate RF radiation mitigation using antenna switching. Further, a user override may be received, wherein determining to activate RF radiation mitigation using antenna switching may be based on the user override.

Further embodiments include a method of performing the various operations discussed above, performed by the multi-antenna mobile device.

Further embodiments include a multi-antenna mobile device having means for performing functions corresponding to the various operations discussed above.

Further embodiments include a non-transitory processor-readable storage medium having stored thereon processor-executable instructions configured to cause a processor to perform functions corresponding to the various operations discussed above.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

DETAILED DESCRIPTION

Figure 1:
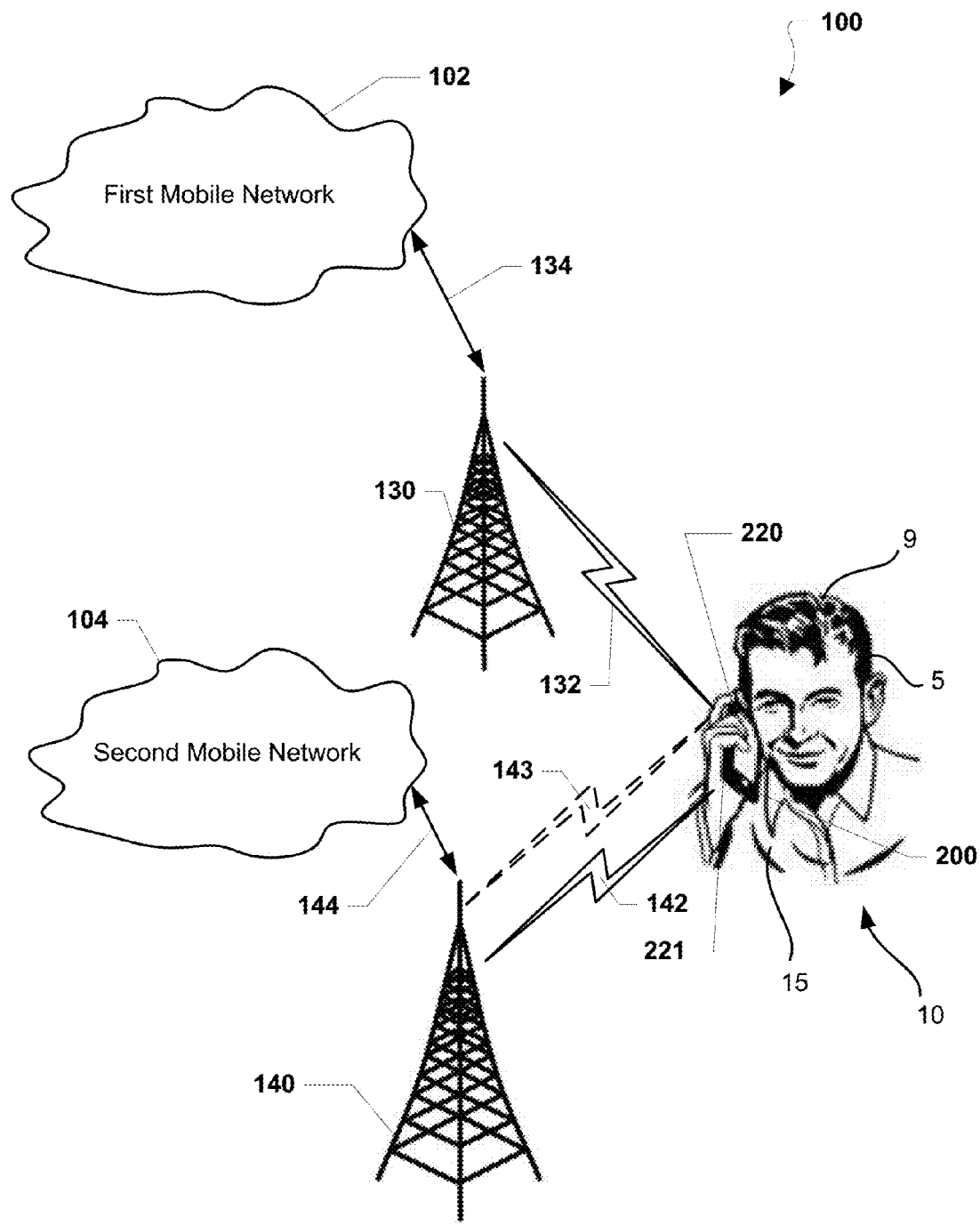
FIG. 1 is a communication system block diagram of a network suitable for use with various embodiments.

Various embodiments will be described in detail, with reference to the accompanying drawings. Wherever possible the same reference numbers may be used throughout the drawings to refer to the same or like parts. References made to particular examples and implementations are for illustrative purposes, and are not intended to limit the scope of the invention or the claims.

The word "exemplary" is used herein to mean "serving as an example, instance, or illustration." Any implementation described herein as "exemplary" is not necessarily to be construed as preferred or advantageous over other implementations.

The terms "mobile communication device," "multi-antenna mobile device," and "wireless communications device" are used interchangeably herein to refer to any one or all of cellular telephones, smart phones, personal or mobile multimedia players, personal data assistants (PDAs), laptop computers, tablet computers, smart books, palm-top computers, wireless electronic mail receivers, multimedia Internet enabled cellular telephones, wireless gaming controllers, and similar personal electronic devices that include a programmable processor and memory and circuitry for establishing wireless communication pathways and transmitting/receiving data via wireless communication pathways. The term "multi-antenna mobile device" more specifically refers to a device including at least two antennas and the capability of switching between them while maintaining a continuous communication subscription session.

In various embodiments, RF radiation to select portions or regions of the multi-antenna mobile device user's anatomy, such as (but not limited to) the head or chest, may be reduced and/or minimized. A processor of the multi-antenna mobile device may determine whether the multi-antenna mobile device is within a predetermined distance of (i.e., near) a select portion of the user. The predetermined distance from the select portion of the user at which RF radiation mitigation actions are indicated may be a few centimeters according to various embodiments. The select portion may be a default region of a user's body, such as the cranium, a portion selected by the user and saved in memory as part of user settings, any individual portion of the user's body, or the user's entire body. In this way, a particular portion of the body or the whole body may be targeted for RF mitigation. For example, if the user has a heart condition the chest or upper torso may be the select portion of the user. The cranium (i.e., the upper region of a user's head) may be the select portion of the user and is used for exemplary purposes in various embodiments. In other embodiments, other select portions of the user may be considered. In response to determining that the multi-antenna mobile device is within the predetermined distance from the sensitive region, the processor may switch to using an antenna that is further away from that region for communications (referred to generally herein as the second antenna). For example, after determining that the multi-antenna mobile device is being held within a predetermined distance of a user's head, a processor of the device may switch active communications to using the antenna that is farthest from the user's head.

In various embodiments, predictive analysis based on one or more proximity inputs may be used to make the determination as to whether the multi-antenna mobile device is within the predetermined distance from the select portion of the user. For example, a motion sensor, image sensor, pressure sensor, and/or other suitable sensor of the multi-antenna mobile device may be used as a proximity sensor to generate proximity inputs that the device processor can use to determine whether the device is within the predetermined distance from the select portion of the user. Additionally or alternatively, the device processor may determine that the multi-antenna mobile device is not within the predetermined distance from the select portion of the user based upon activation of a hands free device, such as a headphone jack or Bluetooth earpiece, or an operating mode, such as speaker mode or rendering of video on the display screen.

In various embodiments, the selection of the antenna to use may consider more than just proximity to sensitive areas of the user. A processor of the multi-antenna mobile device may compare signal strengths between antennas in order to avoid using an antenna with a weak connection. In some embodiments, the processor of the multi-antenna mobile device may determine whether the receive and transmit signal strengths of the antenna that is furthest away from a select portion of the user meet an acceptance signal strength threshold after switching antennas, and switch back to the other antenna if the measured receive or transmit signal strength does not meet the signal strength threshold (i.e., is too low to support reliable communications). Thus, a weak signal strength may outweigh a RF radiation profile of an antenna when making an antenna selection determination.

FIG. 1 illustrates a wireless network system 100 suitable for use with various embodiments. A multi-antenna mobile device 200 may establish and maintain wireless communications with one or more base stations, such as first base station 130 or second base station 140. The base stations (e.g., 130, 140) may be part of larger communication networks (e.g. 102, 104) of one or more carriers associated with mobile communication devices and/or subscriptions of mobile communication devices, and/or its roaming partners. A first mobile network 102 and a second mobile network 104 may be typical mobile networks that may include a plurality of cellular base stations (e.g., 130, 140). The multi-antenna mobile device 200 may be in communication with the first mobile network 102 through a first wireless communication link 132 to the first base station 130. The multi-antenna mobile device 200 may also or alternatively be in communication with the second mobile network 104 through a second wireless communication link 142 to the second base station 140. The first base station 130 may be in communication with the first mobile network 102 over a connection 134. The second base station 140 may be in communication with the second mobile network 104 over a connection 144. In addition, the first mobile network 102 and the second mobile network 104 may be parts of a single combined mobile network. The communication links 132, 142 and 143 may be made through two-way wireless communication links, using various radio access technologies (RATs).

The multi-antenna mobile device 200 and the base stations 130, 140 may each have at least one transmitter and receiver for wireless communications. In various embodiments, the multi-antenna mobile device 200 may include at least a first antenna 220 and a second antenna 221 that can be used to establish the wireless communication links 132, 142 with the base stations 130, 140. For example, the multi-antenna mobile device 200 may be a dual SIM dual active (DSDA) phone with two antennas 220, 221, two modem stacks for the two SIMs, and the capability to switch modem stack communications with a particular base station 130, 140. In this way, the multi-antenna mobile device 200 may alternatively establish a third communication link 143 with the second base station 140 using the first antenna 220.

In various embodiments, a processor of the multi-antenna mobile device may select and use for active communications an antenna (e.g., 220, 221) chosen to mitigate RF radiation to a user 10. In addition, select portions or regions of the anatomy of the user 10, such as (but not limited to) the head 5, cranium 9, or chest 15, may be targeted for RF mitigation. This choice may also maintain and ensure signal strength for communications is reliable.

Figure 2:
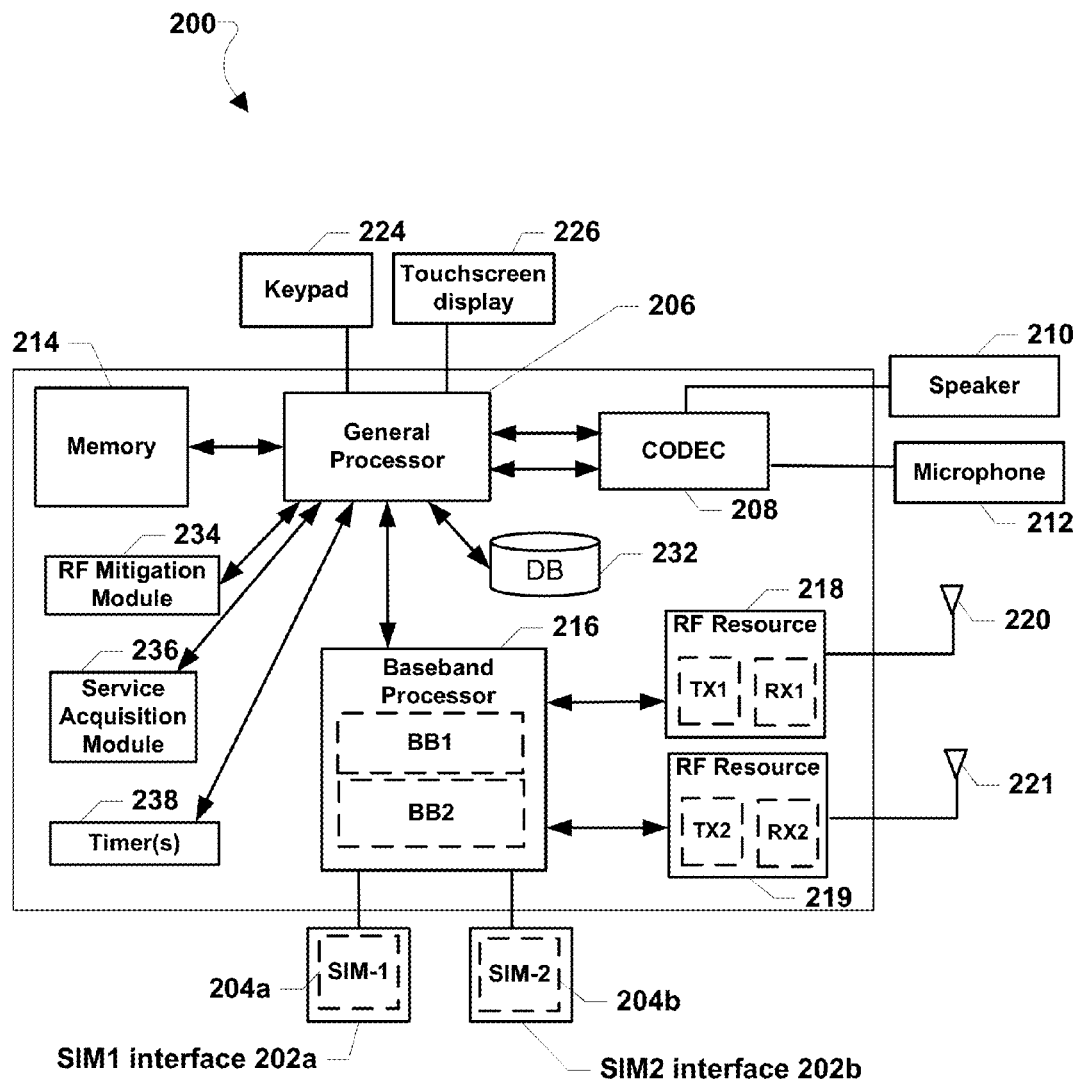
FIG. 2 is a component block diagram of a multi-antenna mobile device in accordance with various embodiments.

FIG. 2 is a functional block diagram of the multi-antenna mobile device 200 that is suitable for implementing various embodiments. With reference to FIGS. 1-2, the multi-antenna mobile device 200 may include a first SIM interface 202a, which may receive a first identity module SIM-1 204a that is associated with the first subscription. The multi-antenna mobile device 200 may also include a second SIM interface 202b, which may receive a second identity module SIM-2 204b that is associated with the second subscription. The various embodiments are not limited to a multi-SIM device and may be implemented in a mobile communication device with only a single SIM, as well as more than two SIMs.

The multi-antenna mobile device 200 also includes at least one controller, such as a general processor 206, which may be coupled to a coder/decoder (CODEC) 208. The CODEC 208 may in turn be coupled to a speaker 210 and a microphone 212. The general processor 206 may also be coupled to at least one memory 214. The memory 214 may be a non-transitory tangible computer readable storage medium that stores processor-executable instructions. For example, the instructions may include routing communication data relating to the first or second subscription though a corresponding baseband-RF resource chain. The memory 214 may store operating system (OS), as well as user application software and executable instructions. The memory 214 may also store application data, such as an array data structure.

The general processor 206 and the memory 214 may each be coupled to at least one baseband modem processor 216. Each SIM in the multi-antenna mobile device 200 (e.g., SIM-1 204a and SIM-2 204b) may be associated with a baseband-RF resource chain. Each baseband-RF resource chain may include the baseband modem processor 216 to perform baseband/modem functions for communications on a SIM, and one or more amplifiers and radios, referred to generally herein as RF resources 218. In one embodiment, baseband-RF resource chains may share a common baseband modem processor 216 (i.e., a single device that performs baseband/modem functions for all SIMs on the wireless device). Alternatively, each baseband-RF resource chain may include physically or logically separate baseband processors (e.g., BB1, BB2).

The RF resources 218, 219 may each be communication circuits or transceivers that perform transmit/receive functions for the associated SIM of the wireless device. The RF resources 218, 219 may be communication circuits that include separate transmit and receive circuitry, or may include a transceiver that combines transmitter and receiver functions. The RF resources 218, 219 may be coupled to a wireless antenna (e.g., a first wireless antenna 220 and a second wireless antenna 221). The RF resources 218, 219 may also be coupled to the baseband modem processor 216.

The multi-antenna mobile device 200 may also include an RF mitigation module 234, which may be a separate processor or part of the general processor 206. The general processor 206 may direct the RF mitigation module 234 to determine whether antenna switching needs to be performed. To perform antenna switching, the general processor 206 or the RF mitigation module 234 may direct the baseband processor 216 to switch from the antenna 220, 221 currently used.

The general processor 206 or the RF mitigation module 234 may execute, control, or initiate RF mitigation determinations. When performing RF mitigation determinations, the antennas 220, 221 may send outgoing signals, such as service request signals to a base station for measuring signal strength. In addition, the general processor 206 or the RF mitigation module 234 may receive and use input from various sources for making RF mitigation determinations.

When a processor (e.g., general processor 206 or RF mitigation module 234) determines antenna switching should occur, the processor may direct the antenna 220, 221 in question to receive incoming signals, such as paging signals and pilot signals transmitted from the connected base station. The RF Resources 218, 219 includes circuitry to process received signals and output digital values. Consistent with conventional mobile communication devices, the RF Resources 218, 219 may process the received signal using a low-noise amplifier, an RF mixer and an analog-to-digital converter and other suitable components (not shown) to produce corresponding output.

In some embodiments, the keypad 224, touch screen display 226, microphone 212, or a combination thereof, may perform the function of receiving the request to initiate an outgoing call. For example, the touch screen display 226 may receive a selection of a contact from a contact list or receive a telephone number. In another example, either or both of the touch screen display 226 and the microphone 212 may perform the function of receiving a request to initiate an outgoing call. For example, the touch screen display 226 may receive selection of a contact from a contact list or receive a user input of a telephone number. As another example, the request to initiate the outgoing call may be in the form of a voice command received via the microphone 212. Interfaces may be provided between the various software modules and functions in multi-antenna mobile device 200 to enable communication between them, as is known in the art.

The multi-antenna mobile device 200 may also includes a database 232, a service acquisition module 236, one or more timers 238 (e.g., a no service timer or a power save mode timer) and/or a power supply (not shown). The power supply may be battery-powered, although the techniques described herein may be applicable to devices that are not battery-powered.

The service acquisition module 236 is primarily responsible for determining the technology, channels, and/or service provider that the multi-antenna mobile device 200 should use.

The service acquisition module 236 is also capable of determining when the multi-antenna mobile device 200, or at least one SIM thereof, is operating out-of-service. The service acquisition module 236 sends service requests to the general processor 206. The general processor 206 then controls the RF Resource 218, 219 used to transmit the service requests via the antenna 220, 221 to any nearby base station. The service requests identify one or more frequency bands supported by the respective SIMs 204a, 204b to perform a service signal search.

The general processor 206 is primarily responsible for lower layer signaling of the multi-antenna mobile device 200 and controlling how the multi-antenna mobile device 200 operates in a specific mode, e.g., RF mitigation mode, power save mode, idle/connected mode. Upon receiving service requests from the service acquisition module 236, the general processor 206 may perform a scan on the frequency bands identified in the service requests. If the scan is unsuccessful in acquiring a service signal on which to operate, the general processor 206 may perform another scan using the same service request, a different service request or revert to a deep sleep mode. The database 232 may store channels, inference engine data, or other useful data.

In some embodiments, the general processor 206, the memory 214, the baseband processor(s) 216, the RF mitigation module 234, the service acquisition module 236, and the RF resources 218, 219 may be included in the multi-antenna mobile device 200 as a system-on-chip. In other embodiments, the first and second SIMs 202a, 202b and their corresponding interfaces 204a, 204b may be external to the system-on-chip. Further, various input and output devices may be coupled to components on the system-on-chip, such as interfaces or controllers.

Figure 3:
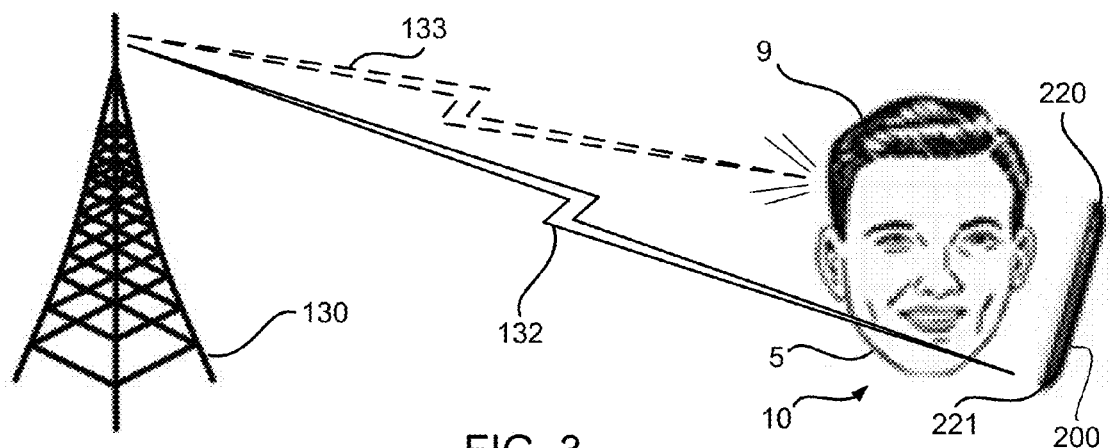
FIG. 3 is a schematic diagram of a multi-antenna mobile device preferentially using a safer antenna in accordance with various embodiments.
Figure 4:
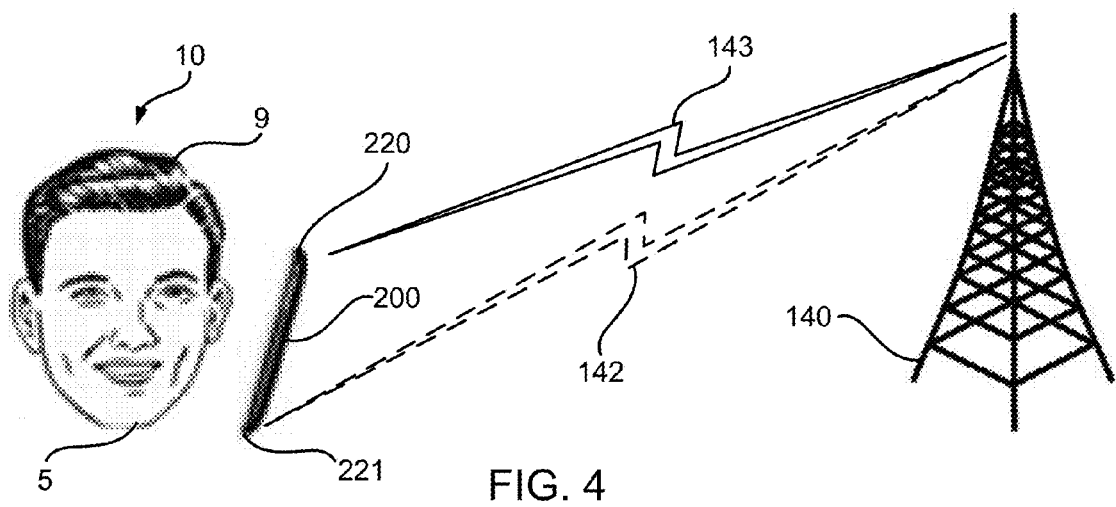
FIG. 4 is a schematic diagram of a multi-antenna mobile device intentionally not using a safer antenna in accordance with various embodiments.
Figure 5:
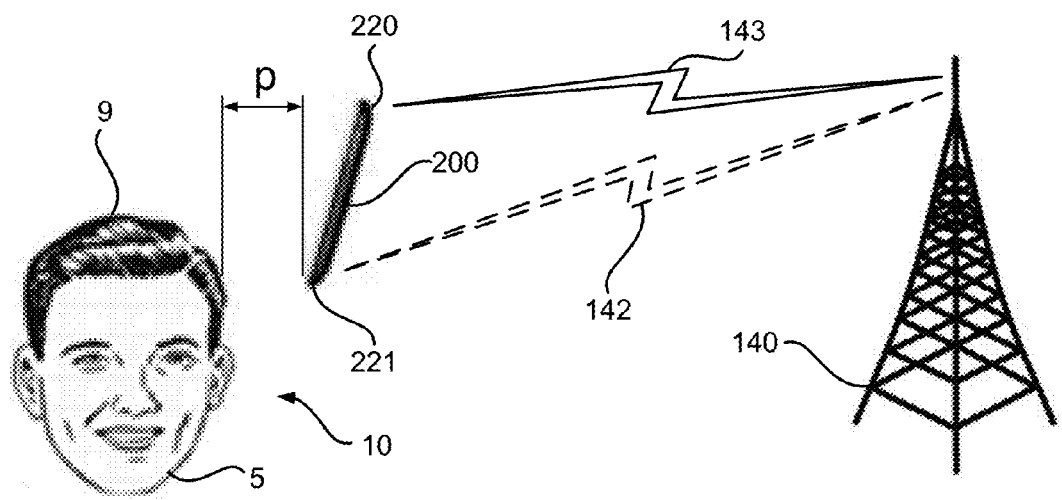
FIG. 5 is a schematic diagram of a multi-antenna mobile device preferentially using another safer antenna in accordance with various embodiments.

FIGS. 3-5 illustrate the multi-antenna mobile device 200 in various configurations relative to a head 5 of a user 10 and the base stations 130, 140 for illustrative purposes to explain elements of the various embodiments. The user 10 may hold the multi-antenna mobile device 200 in one or more of these configurations. Alternatively, someone or something other than the user 10 may hold the multi-antenna mobile device 200. As used herein, the terms "hold" or "held," with reference to the multi-antenna mobile device 200, refer to keeping or sustaining a specified relative position, regardless of what is holding the multi-antenna mobile device 200 in that position. Thus, the user 10, another person, a mechanical support, or another physical element may grasp, carry, or support the multi-antenna mobile device 200.

Relative to the orientation shown in FIGS. 3-5, the second antenna 221 may be located near the bottom of the multi-antenna mobile device 200 and the first antenna 220 may be located near the top of the multi-antenna mobile device 200. The various embodiments are not limited to having just two antennas. Nor do the antennas need to be located at opposed ends of the multi-antenna mobile device 200. The at least two antenna of various embodiments may be located in the same or different portions of the multi-antenna mobile device 200.

FIG. 3 illustrates the multi-antenna mobile device 200 held close to the head 5 of the user 10, such as when talking on a telephone call. In the configuration shown, the first antenna 220 is closer to a cranium 9 of the user 10, as compared to the second antenna 221. In addition, interposed between the multi-antenna mobile device 200 and the base station 130 is the head 5 of the user 10. In this way, the user's head 5 may block or partially block signals forming a second communication link 133 between the base station 130 and the first antenna 220. In contrast, the signals forming a first communication link 132 between the base station 130 and the second antenna 221 may not be significantly blocked or at least blocked less than the first antenna's signals 133.

FIG. 4 illustrates the multi-antenna mobile device 200 once again held close to the head 5 of the user 10, with the first antenna 220 closer to the cranium 9 of the user 10, as compared to the second antenna 221. In the configuration shown in FIG. 4, the head 5 of the user 10 is not interposed between the multi-antenna mobile device 200 and the base station 140. Thus, the head 5 of the user 10 may not block or reduce the strength of the signals forming first and/or second communication links 142, 143.

FIG. 5 illustrates the multi-antenna mobile device 200 once again held close to the head 5 of the user 10. In the configuration shown in FIG. 5, the head 5 of the user 10 is not between the multi-antenna mobile device 200 and the base station 140. However, unlike FIGS. 3 and 4, in FIG. 5 the first antenna 220 is further from the cranium 9 of the user 10, as compared to the second antenna 221. FIG. 5 also illustrates a proximity distance p between the head 5 of the user 10 and the multi-antenna mobile device 200. A processor (e.g., 206 in FIG. 2) of the multi-antenna mobile device 200 using a proximity sensor may determine the proximity distance p. The processor may compare the proximity distance p to the predetermined distance from the head 5 of the user 10 at which RF radiation exposure mitigation by antenna switching may be initiated. While FIG. 5 shows the proximity distance p measured from the bottom of the multi-antenna mobile device 200, the proximity distance p may represent an estimated distance from virtually anywhere on or near the multi-antenna mobile device 200. In some embodiments, the proximity distance p may represent a shortest distance between a select portion of the user 10 and a portion of the multi-antenna mobile device 200. In other embodiments, the proximity distance p may represent an average distance between the select portion of the user 10 and the multi-antenna mobile device 200.

With reference to FIGS. 1-5, in various embodiments, antenna selection may be used to mitigate RF radiation exposure to the user (e.g., 10) of a multi-antenna mobile device (e.g., 200). When the multi-antenna mobile device is up against a user's ear (e.g., see FIG. 1) during a telephone call, the user's head (e.g., 5) may be exposed to some RF radiation from the active antenna. This may be a concern to some users. Such public perception may be sufficient to warrant implementation of RF radiation mitigation techniques.

In general, an object in close proximity to an antenna may absorb power emitted by that antenna. In addition, more or less power may be absorbed by the object depending on the distance of the antenna from the object or the type of antenna used. For example, when a monopole antenna is up against the object, a little over sixty percent (60%) of the power emitted may be absorbed. In comparison, the level of power absorption increases to ninety percent (90%) for a helical antenna held up against the object. In contrast, the levels of power absorption are roughly the same when either the monopole or helical antennas are at least 40 millimeters from the object. Since a user's body may absorb power like other objects, the distance between the antenna and portions or regions of the user's body may have an effect on the amount of RF radiation that is absorbed. Similarly, by moving an active antenna away from an object, such as the user's head or chest (e.g., 5 or 15, respectively), by even just a few centimeters the level of absorbed RF power may be significantly reduced.

With reference to FIGS. 1-5, although multi-antenna mobile device users may reduce RF radiation absorption by holding the multi-antenna mobile device a significant distance away from any portions of their body, often this is not a practical option. For example, when conducting a phone call on a cell phone without a Bluetooth® or other headset, users typically hold the cell phone directly up against an ear. Thus, users may prefer a multi-antenna mobile device that reduces the absorption of RF radiation to their head, while still being able to hold the device up against their ear.

Multi-antenna mobile devices (i.e., devices that include more than one antenna) typically have the various antennas spaced apart from one another in the device. In particular, the various antennas tend to be separated by several centimeters, such as when they are at opposed top and bottom ends of the multi-antenna mobile device (e.g., second antenna 221 and first antenna 220 in FIGS. 1 and 3-5). This enables a multi-antenna mobile device to reduce significantly RF radiation absorption in the select portion of the user by preferentially using an antenna that is further from that select portion. In the various embodiments, a processor of the multi-antenna mobile device may mitigate RF radiation to a user by switching from using a first antenna disposed close to the select portion of the user to using a second antenna disposed further away from the select portion.

In various embodiments, a device processor (e.g., the general processor 206 and/or the RF mitigation module 234) may determine whether to employ RF radiation mitigation through antenna switching by determining whether the mobile device is positioned within a predetermined distance of at least a portion of the user. For example, if the multi-antenna mobile device is not within a predetermined distance of the head or any other portion of the user, switching antennas is not likely to reduce RF power absorbed by the user. In addition, if an alternate antenna is not available or offers a weak signal, antenna switching may not be a viable option. Thus, in various embodiments, a processor of the multi-antenna mobile device may make one or more determinations before switching antennas for RF radiation mitigation.

Figure 6:
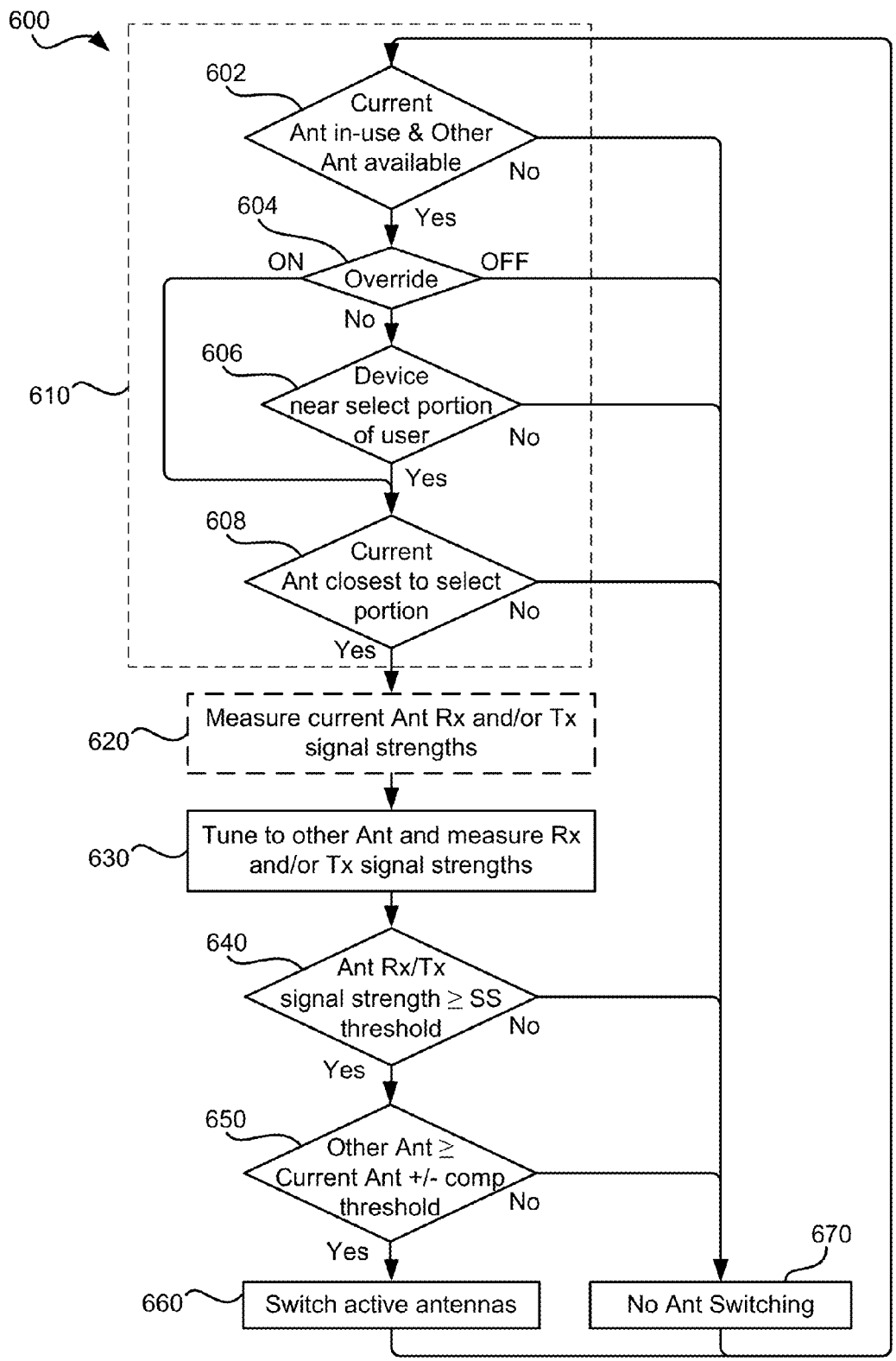
FIG. 6 is a process flow diagram of an embodiment method for determining whether the multi-antenna mobile device is within a predetermined distance of a select portion of the user according to various embodiments.

FIG. 6 illustrates a method 600 for mitigating RF radiation to a user of a multi-antenna mobile device (e.g., the multi-antenna mobile device 200 in FIGS. 1 and 3-5). With reference to FIGS. 1-6, the method 600 may make one or more of various initial determinations 610 before measuring and comparing signals in order to mitigate RF radiation sparingly and effectively. One or more of the initial determinations 610 may be optional, skipped or performed in an order other than that shown. As described, the initial determinations 610 may or may not result in antenna switching.

In determination block 602, the processor of the multi-antenna mobile device may determine whether an antenna is in-use, and whether another antenna is available and not in-use. As used herein with regard to the method 600, the antenna in-use (e.g., one of antennas 220, 221 in FIGS. 1 and 3-5) is referred to as the "current antenna," (Current Ant) while the other available antenna not in-use (e.g., the other one of antennas 220, 221 in FIGS. 1 and 3-5) is referred to as the "other antenna" (Other Ant). For example, an antenna in-use may be transmitting and/or receiving signals for an active communication session between the multi-antenna mobile device and a base station (e.g., 130, 140 in FIGS. 1 and 3-5). Such an active communication session may be associated with a SIM subscription, and may include protocol stacks and transmit/receive chain components. An antenna that is not in use (i.e., not actively receiving call throughput) may be available to transmit and/or receive signals. In response to determining that the current antenna is in-use and the other antenna is available (i.e., determination block 602="Yes"), the processor may determine whether a user override of RF mitigation has been received in determination block 604 (i.e., whether the user has overridden RF radiation mitigation). In response to determining either that no antenna is in-use or that the current antenna is in-use but the other antenna is not available (i.e., determination block 602="No"), the processor need not switch antennas in block 670.

In determination block 604, the processor of the multi-antenna mobile device may determine whether it has received an override of RF mitigation. A user may input an override of RF mitigation through a switch or other user interface to the multi-antenna mobile device. Alternatively, a program operating on the multi-antenna mobile device may generate an override indication or the multi-antenna mobile device may receive an override indication from a remote source. One such override indication may turn off the RF radiation mitigation by antenna switching process (i.e., an "OFF" indication). An OFF indication may be entered or generated to conserve power or processor capacity. Another such override indication may force the RF radiation mitigation by antenna switching process to be on (i.e., an "ON" indication). The ON indication bypasses the proximity determination in determination block 606, described below. For example, a user knowing he customarily holds the phone up to his ear may always want the RF radiation mitigation by antenna switching to be running, thus entering an ON indication through a user-interface. In response to determining an OFF indication is received/entered (i.e., determination block 604="OFF"), the processor need not switch antennas in block 670. In response to determining an ON indication is received/entered (i.e., determination block 602="ON"), the processor may bypass determination block 606 and determine whether the current antenna is closest to the select portion of the user in determination block 608.

In response to determining that the no override indication is received (i.e., determination block 604="No"), the processor may determine whether a select portion of the user is within a predetermined distance of the multi-antenna mobile device in determination block 606. For example, the select portion may be the user's head. This determination may avoid unnecessary switching of antennas when the device is more than a predetermined distance from that select portion of the user. As noted above, RF radiation mitigation by antenna switching may provide little or no benefit when the multi-antenna mobile device is more than a few centimeters away from the user. The processor may use input information available in order to make this determination, as described below with regard to inference engine 600.

The determination as to whether the multi-antenna mobile device is within a predetermined distance of the user, or at least a select portion of the user, may be based on a distance established in advance for triggering the RF radiation mitigation by antenna switching. The predetermined distance may be a distance that is correlated to a particular maximum or acceptable level of RF radiation absorption by tissues of the user, such as four centimeters or other suitable distance. For example, if anything more than 20% absorption is considered unacceptable and a measured distance from the user that achieves 20% absorption is ten centimeters for a particularly strong antenna, then ten centimeters may be established as the predetermined distance. The predetermined distance may vary depending upon the select portion of the body targeted for RF mitigation because the maximum or acceptable level of RF radiation absorption may depend upon the type of tissues in the select portion. For example, the predetermined distance may be greater for the head or cranium than for the chest or pelvis. In addition, the predetermined distance may include a safety factor to ensure RF radiation mitigation by antenna switching is performed well before the distance correlated to that particular level of RF radiation absorption to the user is reached. The safety factor may add a set distance or a percentage of the distance correlated to the particular level of RF radiation absorption to the user.

In response to determining that the multi-antenna mobile device is not within a predetermined distance of the select portion of the user (i.e., determination block 606="No"), the processor need not switch antennas in block 670.

In response to determining that the multi-antenna mobile device is within a predetermined distance of the select portion of the user (i.e., determination block 606="Yes"), the processor may determine whether the current antenna is closest to the select portion of the user in determination block 608. In some embodiments, the determination in determination block 608 may simply check whether the current antenna is the top antenna (e.g., 220 in FIGS. 1 and 3-5), assuming the top antenna is usually the one closest to the select portion of the user. In some embodiments, this determination may be based on accelerometer and/or gyroscope inputs that may inform the device process about the orientation of the multi-antenna mobile device. For example, if accelerometer and/or gyroscope signals indicate that the multi-antenna mobile device is being held vertically (as illustrated in FIGS. 3-5), this may be an indication the multi-antenna mobile device is within the predetermined distance of a user's head. Thus, if the select portion of the user is the region near the cranium and the current antenna is at the top of the device, the processor may determine that the current antenna is closest to the select portion of the user (i.e., determination block 608="Yes"). On the other hand, if accelerometer and/or gyroscope signals indicate that the multi-antenna mobile device is being held at a large angle from vertical or horizontally, the processor may determine that the current antenna is not closest to the select portion of the user (i.e., determination block 608="No"). Alternatively, the determination in determination block 608 may be made using an inference engine (e.g., 600 in FIG. 6) that processes input information available in order to infer whether the current antenna is closest to the user, similar to the determination regarding the proximity of the device to the select portion of the user. In response to determining that the current antenna is not the closest to the select portion of the user (i.e., determination block 608="No"), the processor need not switch antennas in block 670.

In response to determining that the current antenna is closest to the select portion of the user (i.e., determination block 608="Yes"), the processor may optionally measure transmit (Tx) and receive (Rx) signal strengths of the current antenna in block 620. The process may use various metrics as the performance measure. A combination of metrics may also be used. Example metrics include (but are not limited to) transmitted/received: signal level, RXLEV (e.g., for GSM); signal code power, RSCP (e.g., for WCDMA, CDMA 1x, or TD-SCDMA); signal reference power, RSRP (e.g., for LTE); and signal strength indicator, RSSI.

In block 630, the processor may tune from the current antenna to the other antenna and measure at least one of the receiving (Rx) signal strength and the transmitting (Tx) signal strength of that other antenna. The processor may use the same, similar, or different metrics to measure performance from those described for the current antenna. In embodiments in which the multi-antenna mobile device includes more than two antennas, in block 630 the processor may also tune to and measure signal strength of more than one other antennas. The processor may elect to check less than all available antennas. For example, the processor need not measure the signal strength of one or more additional antennas closer to the user's cranium than the current antenna, for instance if the cranium is the select portion of the user.

In determination block 640, the processor may compare the measured signal strengths of the other antenna (i.e., a second antenna measured in block 630) to a configurable signal strength (SS) threshold. The signal strength threshold may ensure a transmit and/or receive signal strength of the other antenna is strong enough to enable reliable communications. The signal strength threshold may be configurable by a user, manufacturer, distributor, technician, software application, or other input for either promoting antenna switching and maximizing RF radiation mitigation to a user, or discouraging switching to a possibly unreliable antenna due to low signal strength. The signal strength threshold may be a positive or negative value or may be a percentage value based on a maximum effective level of signal strength (i.e., 100%).

In response to determining that the transmit and/or receive signal strength(s) of the other antenna do not equal or exceed (i.e., are not less than) the signal strength threshold (i.e., determination block 640="No"), the processor may tune back to the current antenna, essentially not switching antennas in block 670. The device processor may repeat the determination in determination block 602 described, thus repeating the process continuously.

In response to determining that the transmit and/or receive signal strengths of the other antenna equal or exceed the signal strength threshold (i.e., determination block 640="Yes"), the processor may determine whether the transmit and/or receive signal strength of the other antenna is greater than the transmit and/or receive signal strength of the current antenna adjusted by a comparison threshold (i.e., plus or minus the comparison (comp) threshold) in determination block 650. In determination block 650, the processor may compare the measured signal strengths of the antennas (i.e., the measurement from block 620 compared to the measurement from block 630). As with the signal strength threshold, the comparison threshold may be configurable by a user, manufacturer, distributor, technician, software application, or other input method for either promoting antenna switching and maximize RF radiation mitigation to a user or discouraging switching to a low signal strength and possibly unreliable antenna. For example, a processor of the multi-antenna mobile device may receive a configuration input for adjusting the signal strength threshold, and change the signal strength threshold in response to receiving the configuration input.

The comparison threshold may establish an allowable differential between the two antennas. Thus, the comparison threshold may add or subtract a signal strength or percentage value, depending on how big a differential is acceptable and whether the other antenna must have a higher signal strength value than the current antenna. For example, to promote antenna switching, it may be acceptable to switch even though the other antenna has slightly lower signal strength (e.g., 1% lower). In this way, using a 1% comparison threshold subtracted from the current antenna signal strength, the other antenna would need to have signal strength of greater than 99% of the current antenna before the processor will switch antennas.

In response to determining that the signal strength(s) of the other antenna equals or exceeds (i.e., is not less than) the signal strength(s) of the current antenna adjusted by the comparison threshold (i.e., determination block 650="Yes"), the processor may switch antennas in block 660. Switching antennas in block 660 essentially changes the status of the other antenna to being the current antenna. The method 600 may thereafter repeat by returning to determination block 602 as described. In response to determining that the signal strength(s) of the other antenna does/do not equal or exceed the signal strength(s) of the current antenna adjusted by the comparison threshold (i.e., determination block 650="No"), the processor may tune back to the current antenna, essentially not switching antennas in block 670. This method 600 may be repeated continuously by the device processor repeating the determination in determination block 602 described.

The antenna switching implemented in blocks 630 and 660 may implement an antenna switching diversity (ASD) feature customarily used to enable devices to switch antennas based on signal strength. Contemporary devices using ASD to select and switch an antenna after comparing signal strengths. However, convention multi-antenna mobile devices do not determine whether to switch antennas based on whether the device is close to a user's head as in determinations 610 described.

In various embodiments, the processor of the multi-antenna mobile device (e.g., 200 in FIGS. 1 and 3-5) may make one or more determinations before switching antennas for RF radiation exposure mitigation. In various embodiments, the processor of the multi-antenna mobile device may determine from one or more proximity inputs whether the multi-antenna mobile device is at least a predetermined distance from a head of the user. Proximity inputs based on a measurement or estimation of a distance between the multi-antenna mobile device and a user's head are direct proximity inputs. For example, one or more sensors, such as a motion, image, or pressure sensor, may provide a proximity input to the processor for determining whether the multi-antenna mobile device is at least a predetermined distance from a head of the user. Proximity inputs that merely suggest or provide secondary indications that the multi-antenna mobile device is or is not within the predetermined distance from the user's head are proximity inputs. For example, the processor may receive a "headphones-engaged" indication when a headphone jack plugs-into a headphone socket (i.e., the headphone jack is plugged-in).

The processor may use predictive analysis to recognize the headphones-engaged indication as a proximity input, corresponding to the multi-antenna mobile device likely not within a predetermined distance of the user's head. Similarly, pairing and/or actively using a Bluetooth® connection to a headset or remote microphone-speaker system (e.g., hands-free communication system in an automobile) coupled to the multi-antenna mobile device provides an indication that the multi-antenna mobile device likely not within the predetermined distance of the user's head. Further, activation of the multi-antenna mobile device's speaker-mode functionality similarly provides an indication that the multi-antenna mobile device is likely not within the predetermined distance of the user's head.

Additionally, a switch or other user input to the multi-antenna mobile device may provide an override of the RF radiation mitigation functionality.

Figure 7:
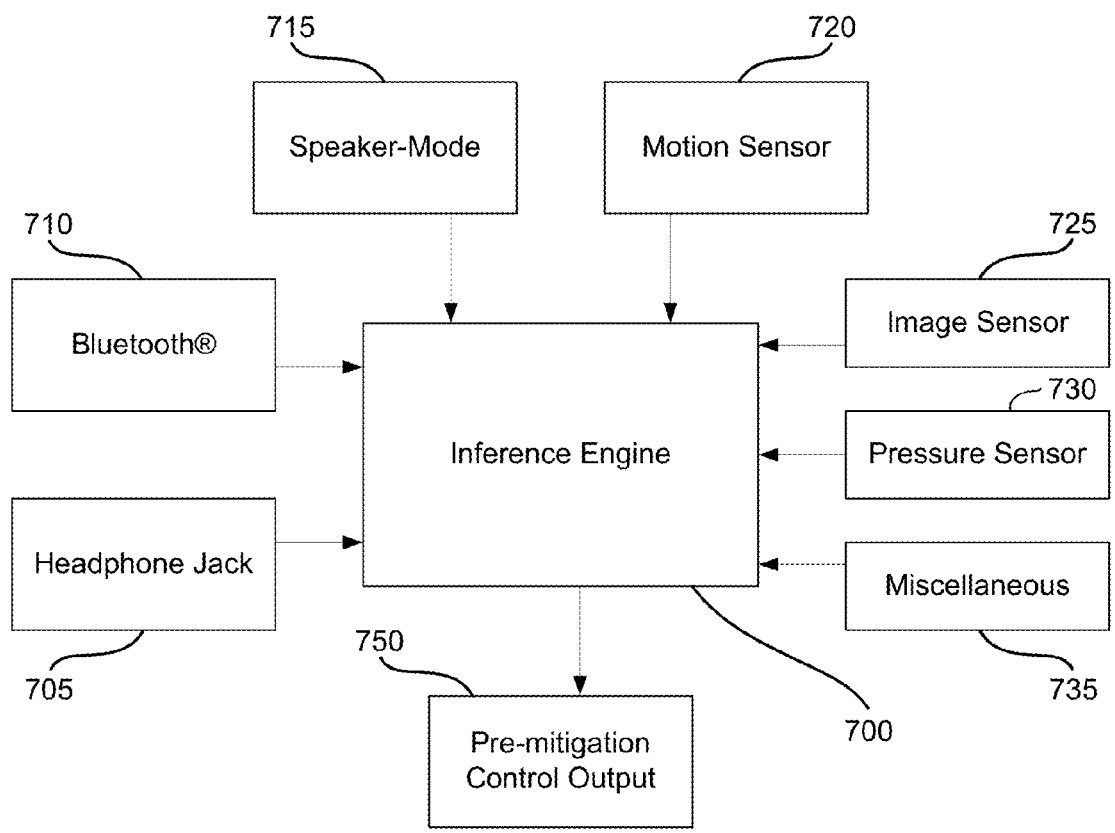
FIG. 7 is a process flow diagram of an embodiment method of mitigating RF radiation to a user of a multi-antenna mobile device according to various embodiments.

FIG. 7 illustrates an example of an inference engine 700 that may be implemented as a software module executed by a processor of the multi-antenna mobile device (e.g., 200 in FIGS. 1 and 3-5) for determining whether the multi-antenna mobile device is within the predetermined distance from the select portion (e.g., head 5, cranium 9, or chest 15 in FIG. 1) of the user. The inference engine 700 may be part of or associated with the general processor (e.g., 206 in FIG. 2), the RF mitigation module (e.g., 234 in FIG. 2), or other processor. With reference to FIGS. 1-7, the inference engine 700 may receive proximity inputs from various sources, including (but not limited to) a headphone jack 705, a Bluetooth® speaker-microphone connection 710, an active speaker-mode 715, a motion sensor 720, an image sensor 725, a pressure sensor 730, one or more miscellaneous other input(s) 735, or any combination thereof. The inference engine 700 may be a rules-based or statistical state-machine based module capable of performing predictive analysis, which analyzes inputs and makes determinations based on that input. In some embodiments, the inference engine 700 may be a software engine, program, subroutine, or other set of processor-executable instructions. The inference engine 700 may generate a pre-mitigation control output 750, reflecting the determination as to whether the multi-antenna mobile device is at least a predetermined distance from the select portion of the user. Such a pre-mitigation control output 750 may either cease or promote further determinations for mitigating RF radiation to the user through antenna switching as described (e.g., with reference to FIG. 6). A determination that the multi-antenna mobile device is not at least a predetermined distance from the user's head may generate a pre-mitigation control output 750 (e.g., determination block 606="No" in FIG. 6) that ceases further determinations for mitigating RF radiation to the user through antenna switching. A determination that the multi-antenna mobile device is within the predetermined distance from the user's head may generate a pre-mitigation control output 750 (e.g., determination block 606="Yes" in FIG. 6) that allows further determinations to continue for mitigating RF radiation to the user through antenna switching.

Some proximity inputs noted above may provide an indication or information that the device processor can use to determine that the multi-antenna mobile device is within a predetermined distance of the head (or other select portion) of the user. For example, an image sensor may provide a close-up image of a portion of an ear, which indicates that the user is holding the multi-antenna mobile device up against that ear. Alternatively, a received indication may suggest that the multi-antenna mobile device is likely not within the predetermined distance of the head of the user. For example, if the headphone jack 705 is plugged-in, the Bluetooth speaker-microphone connection 710 is active, or the multi-antenna mobile device is actively in speaker-mode 715, it may be assumed the multi-antenna mobile device is not within the predetermined distance of the head of the user. Upon receiving such an indication, the device processor may generate a pre-mitigation control output 750 reflecting a determination that the multi-antenna mobile communication device is at least a predetermined distance from the user's head. In some cases, the determination that the multi-antenna mobile device is within the predetermined distance from the user's head may require redundant inputs before generating the pre-mitigation control output 750. For example, although the headphone jack 705 is plugged-in, the processor may further require input from the motion sensor 720 confirming the user's head is not within the predetermined distance of the multi-antenna mobile device before generating the pre-mitigation control output 750.

Other proximity inputs noted above may provide a more direct indication that the multi-antenna mobile device is within a predetermined distance of the head of the user. The motion sensor 720 (e.g., an accelerometer) incorporated within a housing of the multi-antenna mobile device may measure accelerations of the device, such as from being held. Inputs from the motion sensor 720 may be analyzed by the inference engine 700 to determine whether measured accelerations are consistent with the multi-antenna mobile device being held against the user's head. For example, the motion sensor 720 may measure relatively small but regular accelerations when the user is holding the multi-antenna mobile device to his/her head, but much smaller (if any) accelerations when the multi-antenna mobile device is resting on a table, and larger accelerations when the multi-antenna mobile device is being held away from the user's head.

The image sensor 725 may also provide a more direct indication that the multi-antenna mobile device is within a predetermined distance of the head of the user by imaging the user's head or ear. The image sensor 725, such as a camera, may provide an image (i.e., a sensor input) that the processor may analyze with the inference engine 700. In this way, the user's head or a portion thereof may be detected in an image from the image sensor 725. In addition, once the processor detects the user's head or portion thereof in the image, the processor through image analysis may further determine whether the user's head is within the predetermined distance required for RF radiation mitigation by antenna switching.

The pressure sensor 730 may also provide a more direct indication that the multi-antenna mobile device is within a predetermined distance of the head of the user. In particular, when users hold a multi-antenna mobile device directly against their cheek or ear the force against the pressure sensor 730 may be detected. One or more of the pressure sensors 730 may be incorporated into the housing of the multi-antenna mobile device, providing redundant pressure sensor inputs. Thus, although the pressure sensor may provide an indication of proximity of an object, it may be helpful to require additional proximity input to confirm the multi-antenna mobile device is within the predetermined distance of the user's head.

The one or more miscellaneous other inputs 735 (e.g., a gyroscope) may also provide direct and/or indirect indications that the multi-antenna mobile device is within a predetermined distance of the head of the user. For example, a microphone (e.g., if microphone gain from the user's speech is above a certain level, it can be assumed the user is speaking directly into the microphone), a software input, or even input from an external source may be used to determine whether the multi-antenna mobile device is within the predetermined distance of the user's head and particularly the cranium.

The inference engine 700 may also use one or more of the proximity inputs to determine a select portion of the user (e.g., the cranium) that is nearest to each of the multiple antennas. The top antenna may not necessarily be closest to the select portion of the user (e.g., see FIG. 5), which the inference engine 700 may infer from gyroscopes, motion sensor data, and/or the like.

Figure 8:
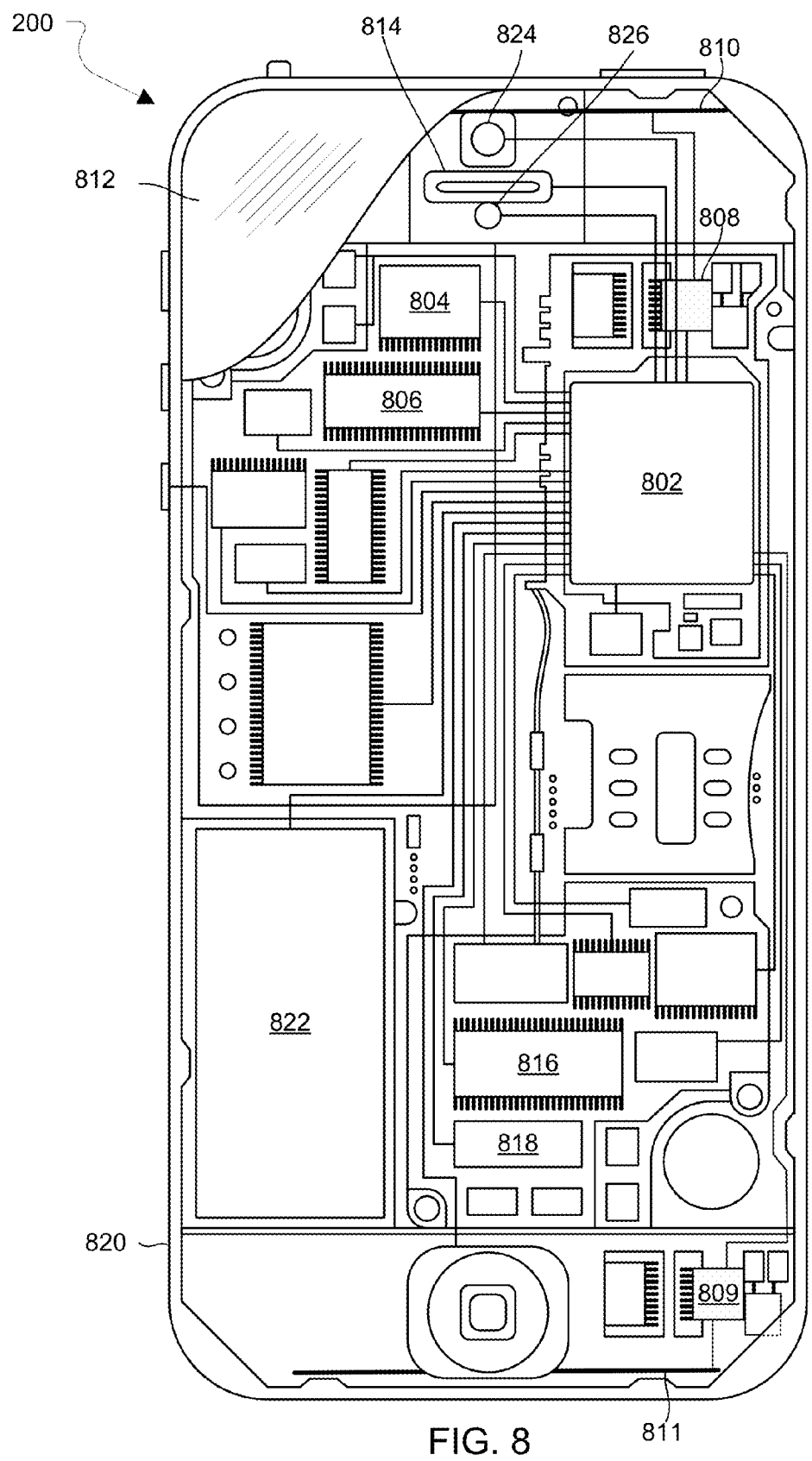
FIG. 8 is a component diagram of an example multi-antenna mobile device suitable for use with various embodiments.

The various aspects may be implemented in any of a variety of multi-antenna mobile devices, an example of which is illustrated in FIG. 8. In particular, FIG. 8 illustrates an example of the multi-antenna mobile device 200 in the form of a cellular telephone. With reference to FIGS. 1-8, the various aspects may be implemented in and/or with any of a variety of other multi-antenna mobile devices, such as a tablet computer, laptop computer, desktop computer or other multi-antenna mobile device. In various aspects, the multi-antenna mobile device 200 may include a processor 802 coupled to a touch screen controller 804 and an internal memory 806. The processor 802 may be one or more multicore ICs designated for general or specific processing tasks. The internal memory 806 may be a non-transitory processor-readable storage medium comprising volatile or non-volatile memory, such as NAND. The processor 802 may be coupled to a touch screen controller 804. The touch screen controller 804 and the processor 802 may be coupled to a touch screen panel 812, such as a resistive-sensing touchscreen, capacitive-sensing touchscreen, infrared sensing touchscreen, etc. Alternatively, the various aspects may be implemented in and/or with any of a variety of devices that do not include a touchscreen controller, touchscreen, or any form of screen or direct data interface, such as a data card, wireless hotspot device, network component, peripheral memory device or similar "headless" devices. The multi-antenna mobile device 200 may have one or more radio signal transceivers 808, 809 (e.g., Peanut®, Bluetooth®, Zigbee®, Wi-Fi, RF radio) and antennas 810, 811 for sending and receiving, coupled to each other and/or to the processor 802. The transceivers 808 and antennae 810 may be used with the above-mentioned circuitry to implement the various wireless transmission protocol stacks and interfaces. The multi-antenna mobile device 200 may include one or more cellular network wireless modem chips 816 coupled to the processor and enabling communication via one or more cellular networks. The multi-antenna mobile device 200 may include a peripheral device connection interface 818 coupled to the processor 802. The peripheral device connection interface 818 may be singularly configured to accept one type of connection, or multiply configured to accept various types of physical and communication connections, common or proprietary, such as USB, FireWire, Thunderbolt, or PCIe. The peripheral device connection interface 818 may also be coupled to a similarly configured peripheral device connection port (not shown). The multi-antenna mobile device 200 may also include speakers 814 for providing audio outputs. The multi-antenna mobile device 200 may also include a housing 820, constructed of a plastic, metal, or a combination of materials, for containing all or some of the components discussed herein. The multi-antenna mobile device 200 may include a power source 822 coupled to the processor 802, such as a disposable or rechargeable battery. The rechargeable battery may also be coupled to the peripheral device connection port to receive a charging current from a source external to the multi-antenna mobile device 200.

The processor 802, may include or represent one or more processors (e.g., the processor 802 may represent one or more of general processor 206, baseband processor 216, RF mitigation module 234, and service acquisition module 236 in FIG. 2). In addition, the processor 802 may be any programmable microprocessor, microcomputer or multiple processor chip or chips that can be configured by instructions (i.e., software instructions, such as applications) to perform a variety of functions, including the functions of the various aspects described above. In some devices may include multiple processors, such as one processor dedicated to wireless communication functions and one processor dedicated to running other applications. Typically, software applications may be stored in the internal memory before being accessed and loaded into the processors. The processors may include internal memory sufficient to store the application instructions. In many devices, the internal memory may be a volatile or nonvolatile memory, such as flash memory, or a mixture of both. For the purposes of this description, a general reference to memory refers to memory accessible by the processors including internal memory or removable memory plugged into the device and memory within the processor themselves.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," or the like are not intended to limit the order of the steps; these words are simply used to guide the reader through the description of the methods. Further, any reference to claim elements in the singular, for example, using the articles "a," "an," or "the" is not to be construed as limiting the element to the singular.

While the terms "first" and "second" are used herein to describe elements of various embodiments (e.g., in FIGS. 1 and 3-5, the antennas 220, 221 or the signals 132, 133, 142, 143), such identifiers are merely for descriptive convenience and are not meant to limit the embodiments to a particular order, sequence, priority, importance, type of network, or carrier.

The various illustrative logical blocks, modules, circuits, and algorithm steps described in connection with the embodiments disclosed herein may be implemented as electronic hardware, computer software, or combinations of both. Illustrating this interchangeability of hardware and software, various illustrative components, blocks, modules, circuits, and steps have been described above generally in terms of their functionality. Whether implemented as hardware or software, such functionality depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, circuitry that is specific to a given function may perform some steps or methods.

In one or more exemplary aspects, the functions described may be implemented in hardware, software, firmware, or any combination thereof. If implemented in software, the functions may be stored as one or more instructions or code on a non-transitory computer-readable medium or non-transitory processor-readable medium. The steps of a method or algorithm disclosed herein may be embodied in a processor-executable software module, which may reside on a non-transitory computer-readable or processor-readable storage medium. Non-transitory computer-readable or processor-readable storage media may be any storage media accessible by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method of mitigating radio frequency (RF) exposure to a user of a multi-antenna mobile device having a first antenna and a second antenna, comprising:
    determining whether the multi-antenna mobile device is within a predetermined distance from a select portion of the user;
    comparing a first signal strength of the first antenna to a second signal strength of the second antenna in response to determining that the multi-antenna mobile device is within the predetermined distance from the select portion of the user; and
    switching active communications from using the first antenna to using the second antenna in response to determining that the second signal strength of the second antenna equals or exceeds the first signal strength of the first antenna adjusted by a comparison threshold.

2. The method of claim 1, wherein determining whether the multi-antenna mobile device is within the predetermined distance from the select portion of the user comprises determining that the multi-antenna mobile device is beyond the predetermined distance from the select portion of the user in response to receiving an indication that a speaker-mode is on.

3. The method of claim 1, wherein determining whether the multi-antenna mobile device is within the predetermined distance from the select portion of the user comprises determining that the multi-antenna mobile device is beyond the predetermined distance from the select portion of the user in response to receiving an indication that a headphone jack is plugged-in.

4. The method of claim 1, wherein determining whether the multi-antenna mobile device is within the predetermined distance from the select portion of the user comprises determining that the multi-antenna mobile device is beyond the predetermined distance from the select portion of the user in response to receiving an indication that a Bluetooth communication is active.

5. The method of claim 1, wherein determining whether the multi-antenna mobile device is within the predetermined distance from the select portion of the user comprises determining whether the multi-antenna mobile device is within the predetermined distance of the select portion of the user based on information from a proximity sensor.

6. The method of claim 5, wherein the proximity sensor comprises a motion sensor.

7. The method of claim 5, wherein the proximity sensor comprises an image sensor.

8. The method of claim 5, wherein the proximity sensor comprises a pressure sensor.

9. The method of claim 1, wherein determining whether the multi-antenna mobile device is within the predetermined distance from the select portion of the user includes using predictive analysis based on a received indication.

10. The method of claim 9, wherein the predictive analysis uses an inference engine and the received indication includes input from at least one of a headphone jack, a Bluetooth speaker-microphone connection, an active speaker-mode, a motion sensor, an image sensor, and a pressure sensor.

11. The method of claim 1, further comprising:
receiving a proximity input;
determining whether the proximity input corresponds to an indication that the multi-antenna mobile device is within the predetermined distance from the select portion of the user; and
generating a pre-mitigation control output reflecting the determination regarding whether the multi-antenna mobile device is at least the predetermined distance from the select portion of the user.

12. The method of claim 1, further comprising:
receiving a configuration input for adjusting the comparison threshold; and
changing the comparison threshold in response to receiving the configuration input.

13. The method of claim 1, further comprising:
determining whether receive and transmit signal strengths on the second antenna are within a signal strength threshold; and
switching active communications back to using the first antenna in response to determining that either of the receive and transmit signal strengths on the second antenna are not within the signal strength threshold.

14. The method of claim 13, further comprising:
receiving a configuration input for adjusting the signal strength threshold; and
changing the signal strength threshold in response to receiving the configuration input.

15. The method of claim 1, further comprising determining whether the user has overridden RF radiation mitigation using antenna switching, wherein determining whether the multi-antenna mobile device is within the predetermined distance from the select portion of the user is performed in response to determining that the user has not overridden RF radiation mitigation using the antenna switching.

16. The method of claim 1, wherein the select portion of the user is at least one of a head, a cranium, and a chest of the user.

17. A multi-antenna mobile device, comprising:
a first antenna;
a second antenna; and
a processor coupled to the first antenna and the second antenna, wherein the processor is configured with processor executable instructions to:
determine whether the multi-antenna mobile device is within a predetermined distance from a select portion of a user;
compare a first signal strength of the first antenna to a second signal strength of the second antenna in response to determining that the multi-antenna mobile device is within the predetermined distance from the select portion of the user; and
switch active communications from using the first antenna to using the second antenna in response to determining that the second signal strength of the second antenna equals or exceeds the first signal strength of the first antenna adjusted by a comparison threshold.

18. The multi-antenna mobile device of claim 17, wherein the processor is further configured with processor executable instructions to determine that the multi-antenna mobile device is beyond the predetermined distance from the select portion of the user in response to receiving an indication that a speaker-mode is on, a headphone jack is plugged-in, or a Bluetooth communication is active.

19. The multi-antenna mobile device of claim 17, further comprising a proximity sensor, wherein the processor is further configured with processor executable instructions to determine whether the multi-antenna mobile device is within the predetermined distance of the select portion of the user based on information from the proximity sensor.

20. The multi-antenna mobile device of claim 19, wherein the proximity sensor comprises at least one of a motion sensor, an image sensor, and a pressure sensor.

21. The multi-antenna mobile device of claim 17, wherein the processor is further configured with processor executable instructions to determine whether the multi-antenna mobile device is within the predetermined distance from the select portion of the user using predictive analysis based on a received indication.

22. The multi-antenna mobile device of claim 17, further comprising:
a proximity sensor coupled to the processor, wherein the processor is further configured with processor executable instructions to determine whether the multi-antenna mobile device is within the predetermined distance of the select portion of the user based on an indication received from the proximity sensor.

23. The multi-antenna mobile device of claim 17, wherein the processor is further configured to:
determine whether receive and transmit signal strengths on the second antenna are within a signal strength threshold; and
switch active communications back to using the first antenna in response to determining that either of the receive and transmit signal strengths on the second antenna are not within the signal strength threshold.

24. A multi-antenna mobile device, comprising:
means for determining whether the multi-antenna mobile device is within a predetermined distance from a select portion of a user;
means for comparing a first signal strength of a first antenna to a second signal strength of a second antenna in response to determining that the multi-antenna mobile device is within the predetermined distance from the select portion of the user; and
means for switching active communications from using the first antenna to using the second antenna in response to determining that the second signal strength of the second antenna equals or exceeds the first signal strength of the first antenna adjusted by a comparison threshold.

25. A non-transitory processor-readable storage medium having stored thereon processor-executable instructions configured to cause a processor to perform operations for mitigating radio frequency (RF) radiation exposure to a user of a multi-antenna mobile device having a first antenna and a second antenna, the operations comprising:
determining whether the multi-antenna mobile device is within a predetermined distance from a select portion of the user;
comparing a first signal strength of the first antenna to a second signal strength of the second antenna in response to determining that the multi-antenna mobile device is within the predetermined distance from the select portion of the user; and
switching active communications from using the first antenna to using the second antenna in response to determining that the second signal strength of the second antenna equals or exceeds the first signal strength of the first antenna adjusted by a comparison threshold.

* * * * *